United States Patent [19]

Dubin

[11] 4,361,492

[45] Nov. 30, 1982

[54] PARTICULATE DISPERSANT ENHANCEMENT USING ACRYLAMIDE-ACRYLIC ACID COPOLYMERS

[75] Inventor: Leonard Dubin, Skokie, Ill.

[73] Assignee: Nalco Chemical Company, Oak Brook, Ill.

[21] Appl. No.: 252,695

[22] Filed: Apr. 9, 1981

[51] Int. Cl.$^3$ .............................................. C02F 5/12
[52] U.S. Cl. .................................. 252/175; 210/701; 252/180; 252/357
[58] Field of Search .................. 252/175, 357, 180; 210/701

[56] References Cited

U.S. PATENT DOCUMENTS

| | | | |
|---|---|---|---|
| 3,110,666 | 11/1963 | Hedley | 210/701 |
| 3,419,502 | 12/1968 | Newman | 252/180 |
| 3,463,730 | 8/1969 | Booth | 252/180 |
| 3,663,448 | 5/1972 | Ralston | 252/175 |
| 4,175,100 | 11/1979 | Schiller | 252/175 |
| 4,279,768 | 7/1981 | Busch | 210/701 |

*Primary Examiner*—John D. Smith
*Attorney, Agent, or Firm*—John G. Premo; Robert A. Miller; John S. Roberts, Jr.

[57] ABSTRACT

A method of enhancing the activity of water-soluble, low molecular weight polymeric dispersants used to suspend iron oxides in cooling waters which also contain soluble iron compounds comprises treating such waters with the water-soluble, low molecular weight polymeric dispersant and a water-soluble copolymer consisting of 25% by weight of acrylic acid and 75% by weight acrylamide with the ratio of copolymer to soluble iron being 1:1.

2 Claims, No Drawings

PARTICULATE DISPERSANT ENHANCEMENT USING ACRYLAMIDE-ACRYLIC ACID COPOLYMERS

INTRODUCTION

There are a variety of commercially available particulate $Fe_2O_3$ dispersants. The difficulty with these dispersants is that the dispersant activity is sensitive to the presence of soluble iron ($Fe^{2+/3+}$). When soluble iron is present, as for example in cooling water, the dispersant activity of these particulate $Fe_2O_3$ dispersants is strongly and negatively affected. In many cases, dispersant activity is completely inhibited.

THE INVENTION

My invention is the use of a low molecular weight copolymer consisting of 25% acrylic acid and 75% acrylamide to prevent interference by soluble iron of the dispersant activity of particulate $Fe_2O_3$ dispersants. This copolymer, when used in conjunction with a particulate $Fe_2O_3$ dispersant at a use level designed to provide a 1:1 ratio of copolymer to soluble iron, will prevent the inhibition of the performance of the particulate $Fe_2O_3$ dispersant. The polymer may also increase the overall performance of the dispersant in a synergistic manner. It is anticipated that the polymer can be used to protect particulate dispersants for mud, silt, $MnO_2$, $Ca_3(PO_4)_2$, $CaCO_3$, $CaSO_4$, etc. from interference by soluble iron.

The copolymer has a preferred average molecular weight of 10,000 although it may vary from 1,000 to 20,000.

The $Fe_2O_3$ Dispersants

While these materials may be selected from a wide variety of compounds, the most commonly used dispersants are the low molecular weight homo and copolymers of acrylic acid. These acrylic acid-containing polymers usually contain at least 30% by weight of acrylic acid and, preferably, 50% by weight. The comonomer can be, for example, methacrylic acid, maleic acid, methylacrylate, acrylamide, vinylacetate, etc. A typical such material is described and claimed in U.S. Pat. No. 3,419,502, the disclosure of which is incorporated herein by reference. Another useful group of dispersants of this type are the acrylic acid vinyl sulphonate polymers. They generally contain from 5–25 mole percent of the vinyl sulphonate or its alkali metal (preferably Na) salts and from 95–75 mole percent of acrylic acid and its water-soluble alkali metal or ammonium salts. Preferably, the acrylic acid-vinyl sulphonate copolymers contain 10–20 mole percent of the vinyl sulphonate and from 90–80 mole percent of acrylic acid. The molecular weights of these classes of polymers range from as low as 500 to as high as 50,000. Molecular weight ranges of from 750–50,000 are preferred with a molecular weight range of approximately 900–15,000 being especially preferred. Ideally, the molecular weight will range from 1,000–6,000.

Other typical polymers or combinations that may be used as iron oxide dispersants in cooling water systems are set forth below in Table I.

TABLE I

| Composition | Ingredients |
|---|---|
| I | 35% solution of a 3:1 acrylamide/acrylic acid copolymer with approximate M.W. of 10,000. |
| II | 5% (by weight) polyacrylic acid (M.W. 2,000–3,000) plus 20% of an approximate 10,000 M.W. sulfonated copolymer of styrene and maleic acid, remainder water plus caustic to neutralize. |
| III | 13.6% low molecular weight polyacrylic acid (M.W. 2,000–3,000) plus 10.5% polymaleic acid (M.W. 500–1100) aqueous solution. |
| IV | Polyacrylic acid, M.W. 2,000–3,000 (19.5 weight %) plus organo phosphonate[1] |
| V | Polymaleic acid |
| VI | A 4:1 mole ratio copolymer of acrylic acid and methylacrylate (M.W. between 3,000–6,000) 24% active solution, neutralized. |
| VII | Polyacrylic acid (M.W. 2,000–3,000) |
| VIII | ~2.5:1 acrylic acid/methacrylic acid copolymer, M.W. 3,000–8,000. |

[1] 1-Hydroxyethylidene, 1,1-Diphosphonic acid.

ILLUSTRATION OF THE INVENTION

To illustrate the efficacy of the invention, several laboratory tests were performed. The effect of soluble iron on decreasing the activity of several polymeric dispersants to disperse suspended $Fe_2O_3$ is set forth below in Table II.

The various other benefits of the invention are self-explanatory and are set forth in Tables III, IV, and V below.

The test procedure used to generate the data in the Tables is set forth below.

Particulate Iron ($Fe_2O_3$) Dispersancy Test

Standard Conditions

One hundred (100) milligrams (mg) of Fischer reagent grade $Fe_2O_3$ iron oxide powder is washed into a 1500 ml beaker with 1000 ml of synthetic Chicago Tap water (SCTW) that contains the appropriate experimental treatment.

SCTW pH~8
110 ppm $HCO_3^{-1}$ as $CaCO_3$
90 ppm $Ca^{2+}$ as $CaCO_3$
50 ppm $Mg^{2+}$ as $CaCO_3$
Conductivity 400 micromhos In a typical experimental run, four experiments are run simultaneously in a four-place gang stirrer. The solutions in the beakers typically contain 1 ppm polymer acid form actives. The polymers may be identical or different. The gang stirrer is put on maximum speed (~150 rpm) and stirred for 2 or more hours—typically 2 hours. Readings are taken while stirring at ~2.5 cm below the surface of the solution with a Brinkman PC/600 colorimeter using a 470 filter and a 2 cm probe light path. The readings are taken after one and two hours. Dispersancy is measured as a function of the amount of $Fe_2O_3$ dispersed (resuspension values). With this set of conditions and using %T (Transmission) values instead of absorbance (A) for measurement, greater dispersancy is associated with low %T values.

Soluble Iron ($Fe^{2+/3+}$) Variation

The test is run as described above but with 1 or 3 ppm of soluble iron ($Fe^{2+}$) added to the test solution from an acidic (pH-1) stock solution of 1000 ppm $Fe^{2+}$ made from ferrous sulfate. Since the test solution will have a proportional drop in pH from the normal pH-8 to pH-6 or pH-3 (1, 3 ppm $Fe^{2+}$ respectively), the solution pH is raised to pH-8 by the addition of a small amount of dilute NaOH with the gang stirrer in operation. In effect, because of the presence of oxygen and alkalinity, the ferrous iron is in situ converted to $Fe_2O_3$. This procedure effectively simulates the precipitation of iron under many practical circumstances, as for example in cooling water. The result is a test solution containing 100 ppm $Fe_2O_3$ and 3 ppm $Fe^{2+}$ converted to $Fe_2O_3$ and the appropriate amount of experimental treatments.

TABLE II

EFFECT OF SOLUBLE IRON ON EFFECTIVENESS OF PARTICULATE $Fe_2O_3$ DISPERSANTS
(1 ppm polymer actives unless otherwise specified, 100 ppm $Fe_2O_3$, Synthetic Chicago Tap water, pH-7.8)

| Treatment-ppm | % Transmission (resuspension values after 2 hours) | | |
|---|---|---|---|
| | No. $Fe^{2+/3+}$ | 1 ppm $Fe^{2+/3+}$ | 3 ppm $Fe^{2+/3+}$ |
| Blank | 83 | — | — |
| Comp. II | 31.1 | 69.0 | 78.5 |
| Comp. I | 46 | 65.0 | — |
| Comp. III | 45.5 | 77.0 | 75.0 |
| 5 ppm ligninsulfonate | 34 | — | 74.0 |
| 3 ppm Comp. I | — | — | 49.0 |
| Comp. V | 47 | 75.0 | — |
| Comp. IV | 49 | 80.0 | — |
| Comp. VI | 52 | 73.0 | — |
| Comp. VII | 46.5 | 78.0 | — |
| Comp. VIII | 63.0 | 88.0 | — |

NOTE:
Better dispersancy is associated with lower % Transmission values.

TABLE III

Effect of Comp. I on Preventing Interference by Soluble Iron ($Fe^{2+/3+}$) on Particulate Iron Dispersancy by Comp. II and Comp. III (pH-7.8, synthetic Chicago Tap Water, 1 ppm product Actives, 100 ppm $Fe_2O_3$)

| Treatment 1 ppm (actives) | Comp. I actives (ppm) | Soluble Iron $Fe^{2+/3+}$ (ppm) | % transmission (resuspension values after 2 hours) |
|---|---|---|---|
| Blank | | | 83.0 |
| Comp. II (control) | | | 31.1 |
| Comp. II | | 1.0 | 69.0 |
| Comp. II (2½ × control) | | 1.0 | 31.0 |
| Comp. II | 1.0 | 1.0 | 26.0 |
| Comp. II | | 3.0 | 78.5 |
| Comp. II (2½ × control) | | 3.0 | 69.0 |
| Comp. II | 1.0 | 3.0 | 75.0 |
| Comp. II | 3.0 | 3.0 | 41.0 |
| Comp. III (control) | | | 45.5 |

TABLE III-continued

Effect of Comp. I on Preventing Interference by Soluble Iron ($Fe^{2+/3+}$) on Particulate Iron Dispersancy by Comp. II and Comp. III (pH-7.8, synthetic Chicago Tap Water, 1 ppm product Actives, 100 ppm $Fe_2O_3$)

| Treatment 1 ppm (actives) | Comp. I actives (ppm) | Soluble Iron $Fe^{2+/3+}$ (ppm) | % transmission (resuspension values after 2 hours) |
|---|---|---|---|
| Comp. III | | 1.0 | 77.0 |
| Comp. III | 1.0 | 1.0 | 40.0 |
| Comp. III | | 3.0 | 75.0 |
| Comp. III (2½ × control) | | 3.0 | 61.0 |
| Comp. III | 3.0 | 3.0 | 45.0 |

Note:
Better dispersancy is associated with lower % Transmission values.

TABLE IV

Effect of Hardness on the Ability of Comp. I to Prevent Interference by Soluble Iron ($Fe^{2+/3+}$) on Particulate $Fe_2O_3$ Dispersancy by Comp. II (300 ppm hardness synthetic Chicago tap water, pH-7.8, 100 ppm $Fe_2O_3$)

| Treatment (actives-ppm) | Comp. I actives (ppm) | Soluble Iron $Fe^{2+/3+}$ (ppm) | % Transmission (resuspension values after two hours) |
|---|---|---|---|
| 1 ppm Comp. II | — | — | 45.0 |
| 1 ppm Comp. II | — | 1.0 | 83.0 |
| 1 ppm Comp. II | 1.0 | 1.0 | 42.0 |
| 2.5 ppm Comp. II | — | 1.0 | 40.0 |
| 2.5 ppm Comp. II | 1.0 | 1.0 | 33.0 |
| Blank SCTW* | — | — | 83 |
| 1 ppm Comp. II in SCTW | — | — | 31.1 |
| Blank SCTW-600 | — | — | 89 |

*SCTW—Synthetic Chicago tap water.
Note:
In this table, better dispersancy is associated with lower % T values.

TABLE V

Summary of Effectiveness of Comp. I on Preventing Interference by $Fe^{2+/3+}$ of Particulate $Fe_2O_3$ Dispersancy by Compositions

| Treatment 1 ppm actives | % Transmission (Resuspension Values after 2 Hours) | | |
|---|---|---|---|
| | No ppm $Fe^{2+/3+}$ | 1 ppm $Fe^{2+/3+}$ | 1 ppm $Fe^{2+/3+}$ and 1 ppm Comp. I |
| Comp. IV | 49 | 80 | 41 |
| Comp. II | 31.1 | 69 | 26 |
| Comp. III | 45.5 | 77 | 40 |

Note:
Better dispersancy associated with lower % T values.

Having thus described my invention, I claim:

1. A method of enhancing the activity of water-soluble, low molecular weight polymeric dispersants used to suspend iron oxides in cooling waters which also contain soluble iron compounds comprises treating such waters with the water-soluble, low molecular weight polymeric dispersant and a water-soluble copolymer consisting of 25% by weight of acrylic acid and 75% by weight acrylamide with the ratio of copolymer to soluble iron being 1:1.

2. The method of claim 1 where the polymer has a molecular weight within the range of 1000–20,000.

* * * * *